(12) United States Patent
Rubinsztajn

(10) Patent No.: US 6,313,255 B1
(45) Date of Patent: Nov. 6, 2001

(54) TELECHELIC SILOXANE POLYMERS WITH MULTIPLE EPOXY END-GROUPS

(75) Inventor: Slawomir Rubinsztajn, Niskayuna, NY (US)

(73) Assignee: General Electric Company, Pittsfield, MA (US)

( * ) Notice: Subject to any disclaimer, the term of this patent is extended or adjusted under 35 U.S.C. 154(b) by 0 days.

(21) Appl. No.: 09/437,548

(22) Filed: Nov. 10, 1999

Related U.S. Application Data

(60) Provisional application No. 60/112,960, filed on Dec. 18, 1998.

(51) Int. Cl.$^7$ .............................. C08G 77/14; C08G 77/12
(52) U.S. Cl. ................................. 528/27; 528/15; 528/32; 528/37; 528/31; 528/479; 522/99; 522/170
(58) Field of Search ....................... 522/99, 170; 528/15, 528/32, 37, 31, 27, 479

(56) References Cited

U.S. PATENT DOCUMENTS

| | | |
|---|---|---|
| 4,208,503 | 6/1980 | Martin . |
| 4,421,904 | 12/1983 | Eckberg et al. . |
| 4,617,238 * | 10/1986 | Crivello et al. . |
| 4,640,967 | 2/1987 | Eckberg . |
| 5,187,251 | 2/1993 | Jachmann et al. . |
| 5,217,805 | 6/1993 | Kessel et al. . |
| 5,258,480 | 11/1993 | Eckberg et al. . |
| 5,360,833 * | 11/1994 | Eckberg et al. . |
| 5,391,676 | 2/1995 | Eckberg et al. . |
| 5,650,453 | 7/1997 | Eckberg et al. . |

* cited by examiner

Primary Examiner—Margaret G. Moore
Assistant Examiner—Kuo-Liang Peng

(57) ABSTRACT

Telechelic polymers are presented, comprising polysiloxane polymers having multiple epoxy end-groups of the formula $$G—R^3—SiR^1R^2O(SiR^1R^2O)_mSiR^1R^2—R^3—G$$

wherein each $R^1$ and $R^2$ are independently monovalent alkyl, alkoxy, aryl, aryloxy, and halohydrocarbon radicals having from 1 to 20 carbon atoms, halohydrocarbon radicals having the formula $C_nF_{2n+1}CH_2CH_2—$ wherein n is an integer from 1 to 18; m is an integer in the range from 10 to about 1000; $R^3$ is a divalent hydrocarbon radical having from 2 to 18 carbon atoms; and G is a silicon-based functionalized end group, wherein the functionalities are selected from the group consisting of epoxides, vinyl ethers, propenyl ether, or a combination thereof.

27 Claims, No Drawings

TELECHELIC SILOXANE POLYMERS WITH MULTIPLE EPOXY END-GROUPS

This application claims rights of priority from U.S. Provisional patent application Ser. No. 60/112,960, filed Dec. 18, 1998, which is hereby incorporated by reference.

BACKGROUND OF THE INVENTION

This invention relates to telechelic silicone polymers. In particular, this invention relates to telechelic organopolysiloxanes having multiple cationic polymerizable end groups such as epoxy, vinyl ether, or propenyl ether end groups, and to methods for synthesis of the same.

Telechelic polymers are terminally-functionalized, macromolecular polymers. Silicone polymers (organopolysiloxanes) having epoxy and/or vinyl ether functional groups are of particular utility in curable compositions to produce release coatings, that is, coatings which release materials that would ordinarily be adherent. Such materials include pressure-sensitive adhesives for labels, decorative laminates, transfer tapes, and the like.

One common approach to manufacture of organopolysiloxane release coatings is based on hydrosilation of vinyl-terminated polysiloxanes with hydride crosslinkers. Another approach is based on photocatalyzed cross-linking of epoxy-functional organopolysiloxanes. U.S. Pat. Nos. 4,208,503, 4,421,904, 4,640,967, 5,187,251, and 5,217,805, for example, describe epoxy-functional polysiloxanes useful for the preparation of release coatings. These polysiloxanes contain the epoxy functionality located on the polymer ends and/or randomly distributed on the siloxane backbone. These polymers are then mixed with a photo-catalyst such as diaryliodonium hexafluoroantimonate, and cured by an irradiation with UV light to provide a release coating.

The major disadvantage of epoxy-based release coatings over those made by the hydrosilation of vinyl-terminated polysiloxanes is their brittleness. The brittleness of epoxy-functional systems is related to the presence of relatively short segments of dimethylsiloxane units (usually from 5 to 20 dimethylsiloxane units) between crosslinked islands of organic polyethers which have high glass transition temperature. In an attempt to solve this problem, epoxy end-stopped siloxane polymers have been manufactured having 100 or more dimethylsiloxane units between the epoxy functionalized groups. Cure of such polymers results in flexible coatings, but such systems suffer from a very low activity (very slow cure). Slow cure severely limits practical use of such long-chain siloxane polymers.

Accordingly, there remains a continuing need in the art for new functionalized siloxane polymers with both improved cure activity and improved release coating properties upon cure.

SUMMARY OF THE INVENTION

The above-described and other drawbacks and deficiencies of the prior art are overcome or alleviated by the telechelic polymers described herein, comprising polysiloxane polymers having multiple functional end-groups of formula (I)

wherein $R^1$ and $R^2$ are each independently monovalent alkyl, alkoxy, aryl, aryloxy, and halohydrocarbon radicals having from 1 to 20 carbon atoms; m is an integer in the range from 10 to about 1000; $R^3$ is a divalent hydrocarbon radical having from 2 to 18 carbon atoms; and G is a silicon-based functionalized end group selected from the group consisting of epoxides, vinyl ethers, propenyl ether, or a combination thereof. Preferably, G has the structure (II) or (III)

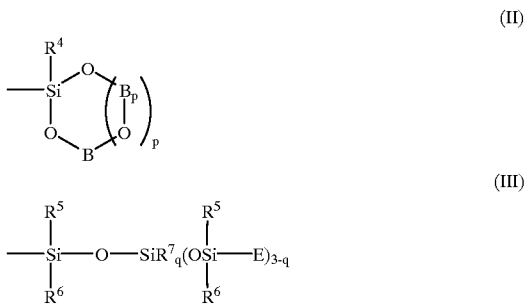

wherein B is a divalent silicon radical of the formula —SiR$^7$E—, p is an integer in the range from 1 to 5, $R^4$, $R^5$, $R^6$, and $R^7$ are each independently monovalent alkyl, alkoxy, aryl, aryloxy, or halohydrocarbon radicals, having up to about 20 carbons, q is 0 or 1, and E is a monovalent radical having an epoxy, vinyl ether, or propenyl ether functionality. Such polymers are produced by the reaction of a polyorganosiloxane having at least one vinyl end group with an excess of an oligomeric organosiloxane having at least three Si—H functional groups, to yield a telechelic siloxane polymer having multiple Si—H functionalities; then reacting this polymer with an excess of an alkenyl epoxide or vinyl ether to yield a telechelic polyorganosiloxane with multiple epoxy and/or vinyl ether end-groups.

DETAILED DESCRIPTION OF THE INVENTION

The composition of the present invention comprises organopolysiloxane polymers having multiple epoxy or vinyl ether end groups, wherein the polymers have formula (I) below

wherein $R^1$ and $R^2$ are each independently monovalent alkyl, alkoxy, aryl, aryloxy, and halohydrocarbon radicals having from 1 to 20 carbon atoms. Preferred monovalent halohydrocarbon radicals have the formula $C_nF_{2n+1}CH_2CH_2$—, wherein n is an integer in the range from 1 to about 18, preferably in the range from 1 to 8. Preferably, $R^1$ and $R^2$ are monovalent hydrocarbon radicals having up to 20 carbon atoms or more preferably up to six carbon atoms. Most preferably, $R^1$ and $R^2$ are methyl or phenyl radicals.

In formula (I), m is an integer in the range from 10 to about 1000, preferably in the range from about 50 to about 200.

G in formula (I) is a silicon-based functionalized end group selected from the group consisting of epoxides, vinyl ethers, propenyl ether, or a combination thereof. Preferably, G has structure (II) or (III)

(II)

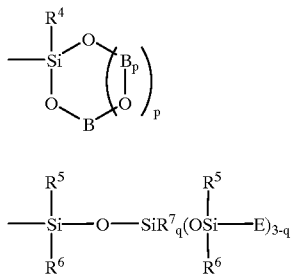

(III)

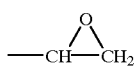

wherein B is a divalent silicon radical of the formula —SiR$^7$E—, p is an integer in the range from 1 to 5, R$^4$, R$^5$, R$^6$, and R$^7$ are independently monovalent alkyl, alkoxy, aryl, aryloxy, and halohydrocarbon radicals having from 1 to 20 carbon atoms, preferably from 1 to 8 carbon atoms. Preferred monovalent halohydrocarbon radicals have the formula C$_n$F$_{2n+1}$CH$_2$CH$_2$—, wherein n is an integer in the range from 1 to about 18, preferably in the range from 1 to 8. q is 0 or 1 and E is independently a monovalent radical having an epoxy, vinyl ether, or propenyl ether functionality.

Suitable monovalent radicals having an epoxy functional group 20 comprise from 2 to about 26, preferably from 2 to about 18, carbon atoms, this epoxy functional group either being present at the end of the radical chain, of the type (IV):

(IV)

or in an intermediate position, of the type (V):

(V)

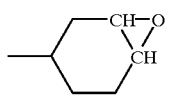

It is possible for this intermediate position epoxy-functional group to be present on a cyclic part of the radical, in particular a ring having from 5 to 7 members, preferably a 6-membered ring of the type (VI):

(VI)

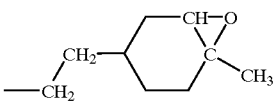

Examples of suitable radicals having epoxy functionality are structures represented by (VII), (VIII), (IX) and (X):

(VII)

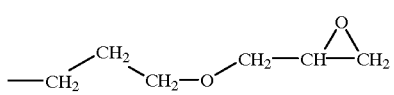

(VIII)

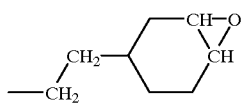

(IX)

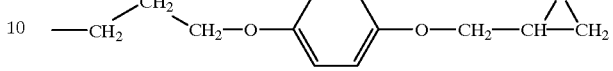

(X)

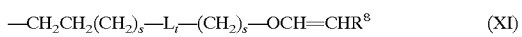

Suitable radicals having vinyl ether or propenyl ether functionalities are known in the art, being represented by the general formula (XI)

—CH$_2$CH$_2$(CH$_2$)$_s$—L$_t$—(CH$_2$)$_s$—OCH=CHR$^8$ (XI)

wherein each s is independently an integer in the range from 0 to 12; t is an integer in the range from 0 to 12; R$^8$ is a hydrogen or methyl radical; and L is a straight-chain or branched divalent hydrocarbon group having up to about 8 carbon atoms, a straight chain or branched unsaturated divalent hydrocarbon group having up to about 8 carbon atoms, divalent aromatic hydrocarbon having up to about 10 carbon atoms, or a straight-chain or branched divalent oxyalkylene group having up to about 8 carbon atoms. Preferably, L is a divalent methylene (—CH$_2$—), ethylene (—C$_2$H$_4$—), 1,2-propylene (—CH$_2$CH(CH$_3$)—), or oxyethylene (—OCH$_2$CH$_2$—)group.

The end-group functionalized polysiloxanes (I) are produced by the reaction of a diorganosiloxane polymer having vinyl end groups (XII)

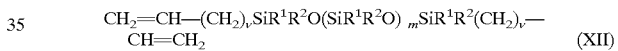

wherein R$^1$, R$^2$, and m are as defined above, and v is an integer from 0 to 16, with an excess of an oligomeric organosiloxane having at least three Si—H functional groups, in the presence of an effective amount of a precious metal catalyst. Reaction of polymers (XII) with oligomeric organosiloxanes is described, for example in U.S. Pat. No. 5,258,480 and U.S. Pat. No. 5,391,676, both of which are incorporated by reference herein. Suitable diorganosiloxane polymers having vinyl end groups (XII) are known in the art, and have from 10 to about 1000 siloxane moieties. Preferred diorganosiloxane polymers (XII) are dimethylsiloxane polymers having a viscosity in the range from about 50 to about 500 centistokes (cSt).

Suitable oligomeric organosiloxanes having at least three Si—H functional groups include, but are not limited to cyclosiloxanes of formula (XIII)

(R$^2$HSiO)$_r$ (XIII)

wherein R$^2$ is as defined above and r is an integer from 3 to 7. Preferably, r is 4 or 5. Use of a volatile oligomeric organosiloxane is preferred, in order to facilitate purification of the intermediate. Other suitable oligomeric organosiloxanes have the formula (XIV)

R$^6{}_y$Si(OSiR$^4$R$^5$H)$_{4-y}$ (XIV)

wherein R$^6$, R$^4$, and R$^5$ are as defined above and y is 0 or 1. A preferred oligomeric organosiloxane (XIV) is tetrakis (dimethylsiloxy)silane.

Suitable precious metal catalysts are known in the art, and can be selected from the group consisting of platinum, ruthenium, rhodium, palladium, osmium, and iridium. Such catalysts are often used in the form of complexes, for example, (n-butyl$_2$S)$_3$RhCl$_3$, platinum divinyl tetramethyldisiloxane complex, HPtCl$_6$, and the like.

After the addition reaction is completed the excess of the oligomeric silicone hydride is removed by the vacuum distillation. The reaction yields an intermediate telechelic polysiloxane polymer (XV)

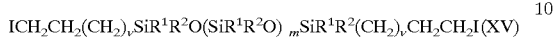
ICH$_2$CH$_2$(CH$_2$)$_v$SiR$^1$R$^2$O(SiR$^1$R$^2$O)$_m$SiR$^1$R$^2$(CH$_2$)$_v$CH$_2$CH$_2$I (XV)

having multiple Si—H functionalities, preferably from 2 to 6, wherein R$^1$, R$^2$, and m are as defined above, and I has the structure (XVI) or (XVII):

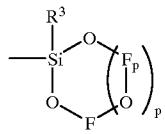
(XVI)

or

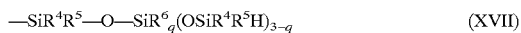
—SiR$^4$R$^5$—O—SiR$^6_q$(OSiR$^4$R$^5$H)$_{3-q}$ (XVII)

wherein F is —SiR$^7$H, p is an integer in the range from 1 to 4, R$^3$, R$^4$, R$^5$, R$^6$, R$^7$, are as defined above, and q is 0 or 1.

Intermediate polymer (XV) is then reacted with an excess of a vinylic or allylic epoxide, or vinylic or allylic alkenyl ethers, or a combination thereof, in the presence of a precious metal catalyst to yield telechelic polyorganosiloxane (I).

The vinylic or allylic epoxide comprises from 2 to about 26, preferably from 2 to about 18, carbon atoms, the epoxy functional group either being present at the end of radical chain, of the type (IV):

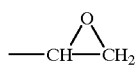
(IV)

or in an intermediate position, of the type (V):

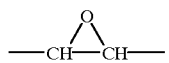
(V)

It is possible for this intermediate position epoxy-functional group to be present on a cyclic part of the radical, in particular a ring having from 5 to 7 members, preferably a 6-membered ring of the type (VI):

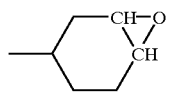
(VI)

Examples of suitable compounds having epoxy functionality are structures of (XVIII), (XVIX), (XX) and (XXI):

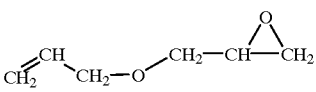
(XVIII)

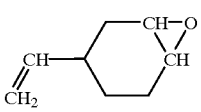
(XIX)

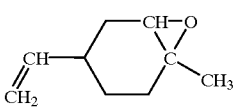
(XX)

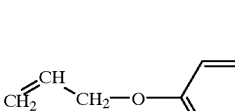
(XXI)

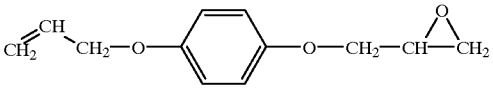

Alkenyl ethers for reaction with intermediate polymer (XV) have the formula

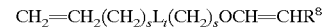
CH$_2$=CH$_2$(CH$_2$)$_s$L$_t$(CH$_2$)$_s$OCH=CHR$^8$ (XXII)

wherein each s is independently an integer from 0 to 12, t is 0 or 1, R$^8$ is a hydrogen or methyl radical, and L is a straight-chain or branched divalent hydrocarbon group, a straight chain or branched divalent hydrocarbon group having up to about 8 carbon atoms, divalent aromatic hydrocarbon group having up to about 10 carbon atoms, or a straight-chain or branched divalent oxyalkylene group having up to about 8 carbon atoms. Preferably, L is a divalent methylene (—CH$_2$—), ethylene (—C$_2$H$_4$—), 1,2-propylene (—CH$_2$CH(CH$_3$)—), or oxyethylene (—OCH$_2$CH$_2$). Exemplary allylic or vinylic alkenyl ethers include, but are not limited to, divinyl ether, vinyl allyl ether, allyloxypropenyl ether, and 1-allyloxy-4-propenoxybutane.

Suitable precious metal catalysts are those described above. In an advantageous feature of the present invention, the same catalyst used in the initial reaction between the vinyl-containing long chain polysiloxane and an oligomeric polysiloxane hydride is used in the reaction of the resulting telechelic polysiloxane hydride and the vinylic or allylic epoxide.

The product of this reaction is a telechelic polysiloxane (I) having multiple end group functionalities selected from the group consisting of epoxy groups, vinyl ether groups, propenyl ether groups, and combinations thereof. These polymers are suitable for cure in the presence of a cationic photoinitiator and UV light. Suitable photoinitiators include, but are not limited to, onium salt photoinitiators, for example, bis-aryliodonium salts having low nucleophilicity anions such as B(C$_6$F$_5$)$_4$—, CF$_3$SO$_3$—, SbF$_6$—, AsF$_6$—, PF$_6$—, or BF$_4$—.

The resulting mixture is applied to paper, metal foil, polyester, polypropylene and other substrates. UV irradiation of the polymer film initiates the crosslinking reaction which yields the release coating. In a particularly advantageous feature of the present invention, the epoxy-functionalized polymers maintain long dimethylsiloxane segments between reactive epoxy-functional groups and sustain reasonable reactivity during the cure under UV irradiation.

The following Examples are provided by way of example only, and should not be read to limit the scope of the invention.

EXAMPLE 1

A. Synthesis of Telechelic Polysiloxane.

800 g of a vinyl terminated polymer with 100 D units [$(CH_3)_2SiO_{2/2}$] and with 0.21 mol of vinyl groups was charged into a 1000-mL three-necked reactor equipped with stirrer, thermometer and condenser with 135 g (0.65 mol) of 1,3,5,7-tetramethylcyclotetrasiloxane ($D_4^H$). The reaction mixture was heated to 90° C. and 0.11 g of (n-butyl$_2$S)$_3$RhCI3 was subsequently added (Rh concentration=2.2 ppm). After a short mixing (5 minutes) an exotherm of about 10° C. was observed. The reaction mixture was then stirred at 90° C. for an additional 90 minutes. Next, any excess of $D_4^H$ was stripped at 95° C./20 mm Hg with nitrogen sparge. The resulting polymer had a viscosity of 390 cSt and contained 680 ppm of hydride. In the next step 90 g (0.73 mol) of 4-vinylcyclohexaneoxide (VCHO) was slowly added over a period of 30 minutes to the reaction mixture at 90° C. Again the 10° C. exotherm was observed. After addition of VCHO was completed, the reaction mixture was stirred at 90° C. for an additional 60 minutes. Analysis by Fourier Transform Infrared (FTIR) spectroscopy indicated the complete conversion of Si—H groups. The reaction mixture was stripped at 100° C. at 20 mm Hg for 1 hour to remove any residual VCHO. The stripped fluid was filtered to afford 920 g of a clear polymer with a viscosity of 1000 cSt, which is presumed to have the structure (XXIII) below:

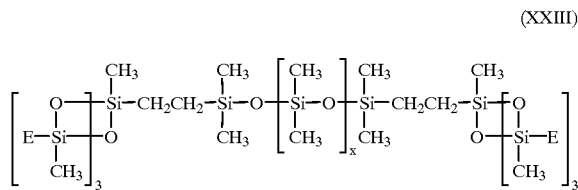
(XXIII)

wherein x is 100 and E is 1,2-epoxy-4-ethylcyclohexyl radical:

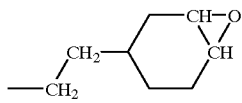

Analysis by Si$^{29}$ NMR confirmed the predicted structures of three epoxy functionalities per end-group.

Structures, viscosity and epoxy equivalents (EEW) of examples of polymers prepared in accordance with the method (Samples A, B, and C) are shown in Table 1 below. Comparative Example UV9315 has the structure (XXIV)

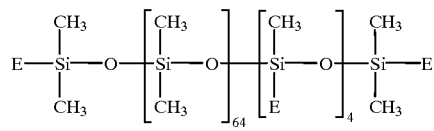
(XXIV)

wherein E is 1,2-epoxy-4-ethylcyclohexyl radical. Comparative Example UV9400 has the structure (XXV)

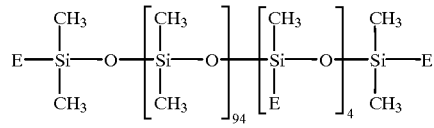
(XXV)

wherein E is 1,2-epoxy-4-ethylcyclohexyl radical.

B. Cure Studies.

The initial cure studies were conducted using an UV processor QC1202 available from Radiation Polymer Co. The above-synthesized polymer having multiple epoxy functional end-groups was blended with 2 weight % of a photo-catalyst, UV9380C available from GE Silicones. The mixture was coated onto 44# ream Thilmeny polyethylene-coated (PK) paper using a blade coater. The coated paper was exposed to UV light in the UV processor at a rate of 400 feet per minute (FPM), using two medium pressure mercury lamps at 200 to 600 watts/inch as shown in Table 1 below. Cure of the coating was evaluated by wiping the coating with a finger (smear test). The silicone transfer was evaluated using SCOTCH™ adhesive tape, which indicated that no samples caused the tape to lose adhesiveness. Thus, the UV-cured silicones of the present invention possess premium release properties and reduced coefficient of friction.

TABLE 1

| Sample # | Structure | Viscosity (cSt) | EEW (g/mol)I | Cure (watts/inch) |
|---|---|---|---|---|
| A | XXIII where x = 100 | 980 | 1566 | 400 |
| B | XXIII where x = 100 (90 wt. %); x = 20 (10 wt. %) | 1240 | 1490 | 300 |
| C | XXIII where x = 150 | 1700 | 2276 | 500 |
| UV9315* | XXIV | 350 | 950 | 300 |
| UV9400* | XXV | 350 | 1459 | 300 |

*Comparative Examples

B. Dynamic Mechanical Analysis.

The samples for dynamic mechanical analysis were cured in a TEFLON® mold at 200 watts per inch for 10 minutes using a Porta-Cure 1000 UV processor available from American Ultraviolet Company. The dynamic mechanical characterization was carried out in tensile deformation mode using film/fiber fixtures on a Rheometrics Solids Analyzer (RSA II) in a thermal ramp of 2° C./minute from −140° C. to 200° C. The frequency was 100 rad/sec for all measurements at a strain of 0.01 to 0.03%. The resulting data is the tensile storage modulus, E', tensile loss modulus, E'', and the ratio E'/E'', defined as tan δ. Comparison of these properties indicates the effect of alterations of chemical structure on mechanical properties. As shown in Table 2 below, comparison of the storage modulus E' at 20° C. (the plateau region) indicates that release coatings prepared from the polymers of the present invention are significantly more flexible than a typical UV cure siloxane coating.

TABLE 2

| Polymer | E' (Pascals) at 20° C. |
|---|---|
| UV9315 (Comparative) | 7.93 × 10$^6$ |
| UV9400 (Comparative) | 5.19 × 10$^6$ |
| A | 3.27 × 10$^6$ |

EXAMPLE 2

A series of reactions was conducted in order to determine the repeatability of the present method. 450 g of a vinyl-terminated dimethylsiloxane polymer having 100 D units [(CH$_3$)$_2$SiO$_{2/2}$] of average composition M$^{Vi}$D$_{100}$M$^{Vi}$ (wherein M$^{Vi}$ is (H$_2$C=CH)(CH$_3$)$_2$SiO$_{1/2}$), about 0.054 moles, was reacted with varying amounts of 1,3,5,7-tetramethyltetracyclosiloxane (D$^H_4$) in the presence of sufficient RhCl$_3$(n-butyl$_2$S)$_3$ to provide about 2 ppm of Rh in the reaction mixture at 90–100° C. in accordance with Example 1. An increase in viscosity was observed in each case. Excess D$^H_4$ was removed under partial vacuum at 100° C., and the resultant tris(dimethylhydrogensiloxy)-stopped linear polydimethylsiloxane intermediate polymer was characterized by viscosity and by hydride content (FTIR). 100 ppm of dimethylcocoamine stabilizer was added, and VCHO was then reacted with the available hydride functionalities to produce the final tris(epoxy)-stopped linear polydimethylsiloxane product in accordance with the method of Example 1. The final products were characterized by viscosity, solids (measurement of the percent weight loss of 1 g of sample heated at 150° C. for 45 minutes), and Epoxy Equivalent Weight (EEW). Results are tabulated in Table 3 below:

TABLE 3

| | | | Intermediate | | Final Product | | |
|---|---|---|---|---|---|---|---|
| Run No. | D$_4$ (g) | Mole ratio* | Hydride (ppm) | Viscosity (cps) | Viscosity (cps) | Solids (%) | EEW |
| 1 | 87 | 6.7 | 842 | 367 | 963 | 99.3 | 1617 |
| 2 | 87 | 6.7 | 850 | 357 | 1356 | 99.7 | 1610 |
| 3 | 87 | 6.7 | 783 | 494 | 1268 | 99.0 | 1617 |
| 4 | 87 | 6.7 | 851 | 463 | 1091 | 98.5 | 1446 |
| 5 | 87 | 6.7 | 860 | 371 | 1040 | 98.8 | 1396 |
| 6 | 78.3 | 6.1 | Nd | Nd | 2412 | 99.8 | 2023 |
| 7 | 52 | 4.1 | Nd | Nd | 5554 | 99.1 | 1935 |
| 8 | 87 | 6.7 | 852 | 359 | 1044 | 99.0 | 1506 |

*D$_4$ to M$^{VI}$D$_{100}$M$^{Vi}$

Control of product viscosity is achieved by use of a large molar excess of D$^H_4$ relative to M$^{Vi}$D$_x$M$^{Vi}$. As shown in the above Table 3, a range of molar ratios from 4.1 to 6.7 (D$^H_4$ to M$^{Vi}$D$_x$M$^{Vi}$) were used, wherein the lowest product viscosities were achieved with the higher molar ratios of silicone hydride to vinyl silicone.

EXAMPLE 3

Use of a vinyl-stopped dimethyldiphenylsiloxane as the backbone of a telechelic tris(epoxy)-stopped polymer was demonstrated by reacting 237 grams of a polymer of approximate structure M$^{Vi}$D$_{172}$D$^{Ph2}_{6.4}$M$^{Vi}$ (wherein D$^{Ph2}$ is (C$_6$H$_5$)$_2$SiO$_{2/2}$) (about 0.0167 mole) with 24 grams of tetramethylcyclotetrasiloxane (D$_4$) (0.10 mole) in the presence of a catalytic amount of the rhodium compound as in Example 2. After the initial reaction, removal of excess D$_4$ afforded a 650 centistoke viscosity tris(M$^H$)-stopped polymer, which, after subsequent reaction with VCHO, ultimately yielded a tris(dimethylepoxysiloxy)-stopped linear silicone bearing diphenylsiloxane units in its linear backbone. The refractive index of this polymer was 1.426, compared with a refractive index of 1.419 for the dimethylsiloxane polymers described above. The product viscosity was 4000 cstk at 98.7% solids, and the EEW=2397.

EXAMPLE 4

233 g of a polymer of approximate structure M$^{Vi}$D$_{186}$M$^{Vi}$ (about 0.0167 mole) was reacted with 24 grams of D$_4$ (0.10 mole) as described in Example 1 to provide a 780 centistoke (cstk) hydride-stopped linear intermediate polymer which, following VCHO reaction and workup, provided a tris (epoxy)-stopped linear polydimethylsiloxane fluid having a viscosity of 6431 cstk, an EEW of 2653, and 99.5% solids.

EXAMPLE 5

100 parts of a polymer prepared as in Run 3 of Example 2 were mixed with 2 parts of UV9380C commercial iodonium photocatalyst package then applied to a 44#/ream Polykraft (PK) liner via 5 roll film splitting coating technique to a 1.16 g/m$^2$ coatweight. Cure was effected by exposure to a single bank of 600 watt/in Fusion™ 'H' type UV lamps at a line speed of 400 feet per minute. The telechelic polymer coated and cured well. Several coating blends incorporating this polymer were also coated and cured, as outlined in Table 4 below, using 2 parts UV9380C per 100 parts of total polymer composition:

TABLE 4

| Coating | Formulation (parts by weight) | | | | |
|---|---|---|---|---|---|
| No. | UV9315 | UV9430 | CHVE | UV9425 | Polymer A |
| 1 | 100 | — | — | — | — |
| 2 | — | — | — | — | 100 |
| 3 | 90 | — | — | — | 10 |
| 4 | 50 | — | — | — | 50 |
| 5 | — | 100 | — | — | — |
| 6 | — | 50 | — | — | 50 |
| 7 | — | — | 50 | 40 | 10 |

UV9315 is a 300 cstk epoxysilicone with approximate structure M$^E$D$_{65}$D$^E_4$M$^E$.

UV9430 is the epoxysilicone Q resin/epoxy-stopped silicone blend CRA disclosed in U.S. Pat. No. 5,360,833, the disclosure of which is incorporated herein by reference.

UV9425 is a 4000 cstk epoxysilicone with approximate structure MD$_{230}$D$^E_{20}$M.

CHVE is the divinyl ether of 1,4-cyclohexanedimethanol (blends of vinyl ethers with epoxysilicones useful for UV cure release coating purposes U.S. Pat. No. 5,650,453, the disclosure of which is incorporated herein by reference).

These coatings were analyzed to determine their friction properties using a Slip/Peel Tester from Instrumentors Inc. It is generally considered that low coefficient of friction (CoF) silicone coatings are easier to process and convert, particularly at high line speeds, than analogous coatings with high CoF. The UV-cured telechelic polymer structure (I) does provide for reduced CoF, as tabulated below in Table 5. The telechelic polymer behaves in the same fashion as the dicarbinol-stopped UV9440 additive insofar as reducing CoF, particularly striking in the case of the 50% CHVE content coating.

Samples of each cured coating on the PK liner were laminated with ASHLAND 1085 solvent-borne acrylic pressure sensitive adhesive (PSA), with an SCK facestock. 2 inch wide tapes were cut from these laminates, and the force required to remove the release coating laminate from the PSA lamina at a pull speed of 0.04 meter/second was determined over a two week period as the laminate was aged at room temperature. Similar measurements were made at a 1.0 meter/sec pull speed. Aged release results (recorded on an IMASS ZPE1000 tester) are shown in Table 5 below.

TABLE 5

| Coating | Average CoF | Peak CoF | Initial (Gram/inch) 0.04 meter | Initial (Gram/inch) 1.0 meter | Aged Two Weeks (Gram/inch) 0.04 meter | Aged Two Weeks (Gram/inch) 1.0 meter |
|---|---|---|---|---|---|---|
| 1 | 262 | 305 | 28 | 35 | 26 | 38 |
| 2 | 176 | 205 | 16 | 42 | 16 | 44 |
| 3 | 169 | 197 | 21 | 37 | 19 | 38 |
| 4 | 176 | 247 | 20 | 37 | 18 | 39 |
| 5 | 469 | 561 | 416 | 536 | 391 | 529 |
| 6 | 317 | 360 | 238 | 300 | 178 | 286 |
| 7 | 141 | 165 | 118 | 180 | 79 | 166 |

These release results show that the telechelic polymers of Formula (I) cure to a flexible coating, as evidenced by the significant rise in release as a function of strip speed, which is a very useful release profile for high speed converting, as higher release at high strip speeds prevent premature dispensing during high speed delamination. The telechelic polymer of Formula (I) can also function as a premium release additive, as shown by its effect on low strip speed release when blended with UV9315 or with the high release product UV9430. Finally, the telechelic polymer (I) can be used as a release additive in blends with CHVE and the high viscosity, high epoxy content UV9425, helping provide useful release properties even in a 50% CHVE based coating.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A telechelic organopolysiloxane polymer having multiple epoxy, vinyl ether, and/or allyl ether end-groups of the formula G—R³—SiR¹R²O(SiR¹R²O)$_m$SiR¹R²R³—G wherein R$^1$ and R2 are independently selected from the group consisting of monovalent alkyl, alkoxy, aryl, and aryloxy radicals having from 1 to 20 carbon atoms and halohydrocarbon radicals of the formula C$_n$F$_{2n+1}$CH$_2$CH$_2$— wherein n is an integer from 1 to 18; m is an integer in the range from 10 to about 1000; R$^3$ is a divalent hydrocarbon radical having from 2 to about 18 carbon atoms; and G is a silicon-based functionalized end group selected from the group consisting of epoxides, vinyl ethers, propenyl ethers, and a combination thereof, wherein G has from 2 to 5 functionalities.

2. The polymer of claim 1, wherein R$^1$ and R$^2$ are independently methyl radicals, phenyl radicals, or a combination thereof, and wherein m is in the range from about 50 to about 200.

3. The polymer of claim 1, wherein R$^1$ and R$^2$ are independently methyl radicals, phenyl radicals, or a combination thereof.

4. The polymer of claim 1, wherein m is in the range from about 50 to about 200.

5. The polymer of claim 1, wherein G has three or four functionalities.

6. The polymer of claim 1, wherein G has the structure

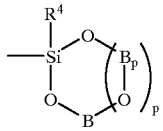

or

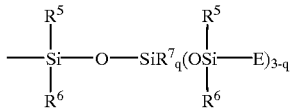

wherein B is a divalent silicon radical of the formula —SiR$^7$E—, p is an integer in the range from 1 to 5, each R$^4$, R$^5$, R$^6$, and R$^7$ are independently selected from the group consisting of monovalent alkyl, alkoxy, aryl, or aryloxy radicals having up to about 20 carbons, and halohydrocarbon radicals of the formula C$_n$F$_{2n+1}$CH$_2$CH$_2$— wherein n is an integer from 1 to 18, q is 0 or 1, and E is a monovalent radical having an epoxy, vinyl ether, or propenyl ether functionality."

7. The polymer of claim 6, wherein p is two or three.

8. The polymer of claim 1, wherein R$^1$ and R$^2$ are independently monovalent hydrocarbon radicals having up to 6 carbons.

9. The polymer of claim 6, wherein R$^4$, R$^5$, R$^6$, and R$^7$, are methyl radicals.

10. The polymer of claim 6, where E is a monovalent radicals having an epoxy functional group comprising from 2 to about 26 carbon atoms, this epoxy functional group either being present at the end of radical chain, of the type:

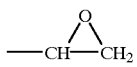

in an intermediate position, of the type:

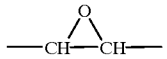

or on a cyclic part of the radical having from 5 to 7 members of carbon atoms.

11. The polymer of claim 10, wherein E is selected from the group consisting of 1,2-epoxybutyl, 1,2-epoxypentyl, 2,3-epoxypentyl, 1,2-epoxyhexyl, 2,3-epoxyhexyl, 3,4-epoxyhexyl, 1,2-epoxyoctyl, 2,3-epoxyoctyl, 1,2-epoxydecyl, 1,2-epoxy-4-ethylcyclohexyl, glycidyl ether, and 1,2-epoxy-4-propylcyclohexyl.

12. The polymer of claim 10, wherein E is 1,2-epoxy-4-ethylcyclohexyl radical.

13. The polymer of claim 6 wherein E has the general formula

—CH$_2$CH$_2$(CH$_2$)$_s$—L$_t$—(CH$_2$)$_s$—OCH═CHR$^8$ wherein each s is independently an integer from 0 to 12, t is an integer from 0 to 1, R$^8$ is hydrogen or a methyl radical, L is selected from the group of divalent radicals having up to 8 carbons consisting of a straight-chain hydrocarbon group, a branched hydrocarbon group, a straight chain unsaturated hydrocarbon group, a branched unsaturated hydrocarbon group, aromatic hydrocarbon group having up to 10 carbon atoms, a straight-chain oxyalkylene group, and a branched oxyalkylene group.

14. The polymer of claim 13, wherein L is selected from the group consisting of methylene, ethylene, 1,2-propylene, 1,4-phenyl and oxyethylene.

15. The polymer of claim 13, wherein E is selected from the group consisting of ethyl vinyl ether, propyl vinyl ether, ethyl allyl ether, and propyl allyl ether.

16. The polymer of claim 1, wherein R$^1$ and R$^2$ are methyl radicals, m is an integer in the range from about 50 to about 200, and G has the structure

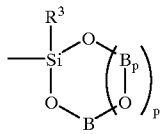

wherein B is the group —SiR$^7$E, p is an integer in the range from 1 to 5, each R$^3$ and R$^7$ are independently a monovalent hydrocarbon radical having from one to eight carbons, and E is a radical comprising at least one functionality selected from the group consisting of epoxy, vinyl ether, and propenyl ether.

17. The polymer of claim 16, wherein p is two, R$^3$ and R$^7$ are methyl radicals, and E is 1,2-epoxy-4-ethylcyclohexyl.

18. A method for the synthesis of a telechelic polysiloxane polymer having multiple epoxy, vinyl ether, and/or allyl ether end groups, comprising reacting a diorganosiloxane polymer having from 10 to about 1000 siloxane units and having vinyl end groups with an oligomeric organosiloxane having at least three Si—H functional groups in the presence of an effective amount of a precious metal catalyst to produce an intermediate polysiloxane polymer having end groups with at least two Si—H functionalities; and reacting the intermediate polysiloxane polymer with reactants selected from the group consisting of vinylic epoxides, allylic epoxides, vinyl alkenyl ethers, allyl alkenyl ethers, and a combination thereof in the presence of an effective amount of a precious metal catalyst.

19. The method of claim 18, wherein the diorganosiloxane polymer is a dimethylsiloxane polymer.

20. The method of claim 18, wherein the oligomeric organosiloxane has the formula (R$^2$HSiO)$_r$ or R$^6_y$Si(OSiR$^4$R$^5$H)$_{4-y}$ wherein each R$^2$, R$^6$, R$^4$, and R$^5$ are independently selected from the group consisting of monovalent alkyl, alkoxy, aryl, or aryloxy radicals having up to about 20 carbons and halohydrocarbon radicals of the formula C$_n$F$_{2n+1}$CH$_2$CH$_2$— wherein n is an integer from 1 to 18, and wherein r is an integer from 3 to 7 and wherein y is 0 or 1.

21. The method of claim 18, wherein the oligomeric organosiloxane is 1,3,5,7-tetramethylcyclotetrasiloxane, 1,3,5,7,9-pentamethylcyclopentasiloxane, or tetrakis(dimethylsiloxy)silane.

22. The method of claim 18, wherein the vinylic or allylic epoxide comprises from 2 to about 26 carbon atoms, the epoxy functional group either being present at the end of radical chain, of the type:

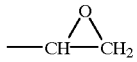

in an intermediate position, of the type:

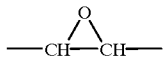

or on a cyclic part of the radical having from 5 to 7 members of carbon atoms.

23. The method of claim 21, wherein the epoxide is selected from the group consisting of 1,2-epoxybutyl, 1,2-epoxypentyl, 2,3-epoxypentyl, 1,2-epoxyhexyl, 2,3-epoxyhexyl, 3,4-epoxyhexyl, 1,2-epoxyoctyl, 2,3-epoxyoctyl, 1,2-epoxydecyl, 1,2-epoxy-4-ethylcyclohexyl, glycidyl ether, and 1,2-epoxy-4-propylcyclohexyl.

24. The method of claim 21, wherein the epoxide 1,2-epoxy-4-vinylcyclohexane.

25. A silicone release composition obtained by UV cure of a composition comprising the silicone polymer of claim 1.

26. A silicone release composition obtained by UV cure of a composition comprising the silicone polymer of claim 2.

27. A silicone release composition obtained by UV cure of a composition comprising the silicone polymer of claim 6.

* * * * *